United States Patent [19]
Hagen et al.

[11] Patent Number: 5,731,507
[45] Date of Patent: *Mar. 24, 1998

[54] INTEGRAL AIRFOIL TOTAL TEMPERATURE SENSOR

[75] Inventors: Floyd W. Hagen, Eden Prairie; Gregg A. Hohenstein, Bloomington; Pennelle J. Trongard, Savage, all of Minn.

[73] Assignee: Rosemount Aerospace, Inc., Akron, Ohio

[*] Notice: The terminal 22 months of this patent has been disclaimed.

[21] Appl. No.: 250,342

[22] Filed: May 27, 1994

Related U.S. Application Data

[63] Continuation of Ser. No. 122,638, Sep. 17, 1993, abandoned.

[51] Int. Cl.$^6$ ............................................. G01C 21/00
[52] U.S. Cl. ........................... 73/182; 73/861.68; 374/143
[58] Field of Search .............................. 73/182, 861.65, 73/861.66, 861, 67, 861.68, 147, 714; 374/141, 142, 143

[56] References Cited

U.S. PATENT DOCUMENTS

| | | | |
|---|---|---|---|
| 2,931,227 | 4/1960 | Werner et al. | 73/349 |
| 2,970,475 | 2/1961 | Werner | 73/339 |
| 3,170,328 | 2/1965 | Werner et al. | 73/349 |
| 3,512,414 | 5/1970 | Rees | 73/349 |
| 4,152,938 | 5/1979 | Danninger | 73/349 |
| 4,615,213 | 10/1986 | Hagan | 73/180 |
| 4,645,517 | 2/1987 | Hagen et al. | 73/182 |
| 4,672,846 | 6/1987 | LeBlond et al. | 73/180 |
| 4,677,858 | 7/1987 | Ohnhaus | 73/861.65 |
| 4,718,273 | 1/1988 | McCormack | 73/180 |
| 4,730,487 | 3/1988 | Deleo et al. | 73/182 |
| 4,765,751 | 8/1988 | Pannone et al. | 374/143 |
| 4,821,566 | 4/1989 | Johnston et al. | 73/178 R |
| 5,018,873 | 5/1991 | Bobo | 374/144 |
| 5,025,661 | 6/1991 | McCormack | 73/180 |
| 5,076,103 | 12/1991 | Lagen et al. | 73/182 |

OTHER PUBLICATIONS

Product Data Sheet 2608 of Rosemount Inc., 1987, 1990, "Rosemount Model 92BH or 92BJ Air Data Flight Test Boom".

Technical Report 5755, Revision A, 1981 of Rosemount Inc. "Rosemount Total Temperature Sensors". (Cover page and p. 27.).

Rosemount Report D8720047, Feb. 1987, "Accuracies for Digital Multiple Output Air Data Systems for Angle of Attack, Pitot and Static Pressure Measurements", by Floyd W. Hagen and Richard V. DeLeo.

Copy of Photographic display and redacted drawing of Rosemount Part Number 129L.

(List continued on next page.)

*Primary Examiner*—Richard E. Chilcot, Jr.
*Assistant Examiner*—William L. Oen
*Attorney, Agent, or Firm*—Nicholas E. Westman; Richard A. Romanchik

[57] ABSTRACT

An air data sensing probe adapted for mounting to an aerodynamically-shaped airfoil or strut attached to an air vehicle. An inlet port located near the leading edge of the strut admits fluid, to a first cavity and then, in turn, to a second cavity, so that the total temperature of the fluid may be measured and a signal related thereto conveyed to suitable flight control gear. A first exhaust port located generally opposite the inlet port allows entrained particles to exit the probe and boundary layer fluid evacuation apertures formed through the strut across the interface between the two cavities permit only a substantially particle-free core sample of fluid on the temperature sensing element. The secondary cavity couples to the primary cavity at an angle so that inertial separation of entrained particles results. In a second embodiment, the air data sensing probe connects to a barrel-shaped probe head so that multiple parameters related to the fluid can be measured, such as total pressure, Pt, static pressure, Ps, and total temperature, Tt, of a fluid flowing relative to the air vehicle as well as angle-of-attack (AOA) of the air vehicle relative to the fluid.

14 Claims, 4 Drawing Sheets

OTHER PUBLICATIONS

Copy of Rosemount Aerospace catalog cover and back pages, and pages entitled "Test and Measurement", Space Program and Turbine Engines.

Copy of redacted drawing of Rosemount Inc. No. 859AC.

Rosemount Total Temperature Sensors Bulletin 1012, revised Jan., 1989.

Redacted drawing for 154CF4 — Rosemount Sensor (1981) (Exhibit A).

Redacted sectional view for 154CF4 — Rosemount Sensor (1981) (Exhibit B).

INTEGRAL AIRFOIL TOTAL TEMPERATURE SENSOR

This is a continuation of U.S. application appl. Ser. No. 08/122,638, filed Sep. 17, 1993, now abandoned. Priority of the prior application is claimed pursuant to 35 USC §120.

BACKGROUND OF THE INVENTION

The present invention relates to air data sensing probes usable on air vehicles. In particular, the present invention includes air data sensing probes integrated into a portion of an airfoil, such as a strut of an L-shaped air data probe or a portion of an air vehicle wing or canard.

Reducing weight and aerodynamic drag continues as a primary design goal for components mounted externally on air vehicles. However, air data probes for sensing and measuring properties of a fluid medium near an air vehicle preferably protrude from the air vehicle to detect relatively undisturbed air flow to register accurate air data. For redundancy and safety, duplicate sensors for such flight-critical information ensure that back-up systems are available in case of failure of a system. Unfortunately, in the case of air data sensing probes, each probe adds aerodynamic drag, weight, complex electrical and, often, pneumatic coupling as well as radar reflectivity.

The aerodynamic drag caused by air data probes that protrude into the fluid stream increases rapidly from subsonic to near-sonic velocities. In fact, as the velocity of an air vehicle rises to near-sonic, the aerodynamic drag of known probes begins a pronounced, and undesired, upward trend. When multiplied for the presence of back-up air data sensing probes, this component of aerodynamic drag can become large. Therefore, there exists a need in the art for aerodynamically-shaped, efficient, air data sensing probes.

SUMMARY OF THE INVENTION

The present invention includes a multifunctional aerodynamically-shaped air data sensing probe integrally formed as a strut of an L-shaped probe or integrated into an airfoil associated with an air vehicle. A forward facing inlet port admits fluid to a primary cavity. The exterior walls of the strut provide the interior wall surfaces of a first portion of the primary cavity, and the second portion of the primary cavity comprises an elongated duct connected to an exhaust port(s) in a low pressure area downstream from the inlet port. A secondary cavity couples to the primary cavity between the first and second portions thereof. A temperature sensing element is suitably isolated within the secondary cavity. A first group of fluid conditioning apertures, formed through the strut, couple the lateral wall surfaces of the first portion of the primary cavity to the exterior of the probe in a region where reduced pressure is produced on the strut exterior. The first group of apertures bleed off heated boundary layer fluid from the lateral interior walls of the primary cavity to the exterior of the strut due to a pressure differential between the primary cavity and the exterior of the strut. A second group of apertures formed through a curved, ramp-shaped deflector wall member dividing the primary and secondary cavities fluidly couple both the primary and secondary cavities to an area of reduced pressure within the strut. Thus, due to the second pressure differential present between at least part of the deflector member and the reduced pressure within the interior of the probe, distributed withdrawal of boundary layer fluid also occurs through the second group of apertures. The second group of apertures can be formed in a porous wall material.

In operation, entrained particles proceed in a generally linear course through the primary cavity from the inlet aperture to the primary exhaust port. At the same time, distributed withdrawal of boundary layer fluid from the first portion of the primary cavity occurs through the lateral walls of the strut defining the primary cavity and/or the perforated deflector member. Thus, a substantially particle-free, unheated core sample of fluid reaches and flows through the secondary cavity.

Preferably, a probe head mounts to the end of the strut remote from the air vehicle. Suitable pneumatic ducting routes within the strut around the second portion of the primary cavity to fluidly couple various sensing ports formed in the probe head to remote pressure sensing components establishing a multifunctional air data sensing capability. Numerous conventional barrel-shaped probe heads coupled to such a strut will generate multiparameter air data sensing. The probe head also may be formed by a continuously curved strut that tapers to a smaller forwardly facing barrel portion at the outer end. Suitable pitot and static pressure sensing ports formed in a portion of the probe head thus provide the facility for sensing flight-critical air data from a single aerodynamically-shaped air data probe. This embodiment of the present invention can utilize myriad aerodynamic probe heads for sensing air data parameters, such as any of the family of aerodynamically compensated pressure tubes disclosed and claimed in U.S. Pat. No. 4,730,487 to DeLeo et al., hereby incorporated by reference. Flight-critical air data parameter information can will be obtained by attaching a probe head portion adapted to sense fluid pressure so that angle-of-attack and angle-of-sideslip can be calculated, as disclosed and claimed in U.S. Pat. No. 4,836,019 to Hagen et al. or U.S. Pat. No. 4,615,213 to Hagen, both of which are hereby incorporated by reference. Furthermore, the air data probe of this invention may be configured as a complete probe transducer unit (PTU), a compact self-contained sensor/transducer assembly proximate the probe mounting surface. Also, air data sensing transducers disposed internally within the probe housing can operate in cooperation with this embodiment. The portion of the strut or airfoil proximate the sensing ports is normally electrically heated to suitably deice the probe for all-weather operation.

DESCRIPTION OF THE PREFERRED EMBODIMENTS

Figure 1:
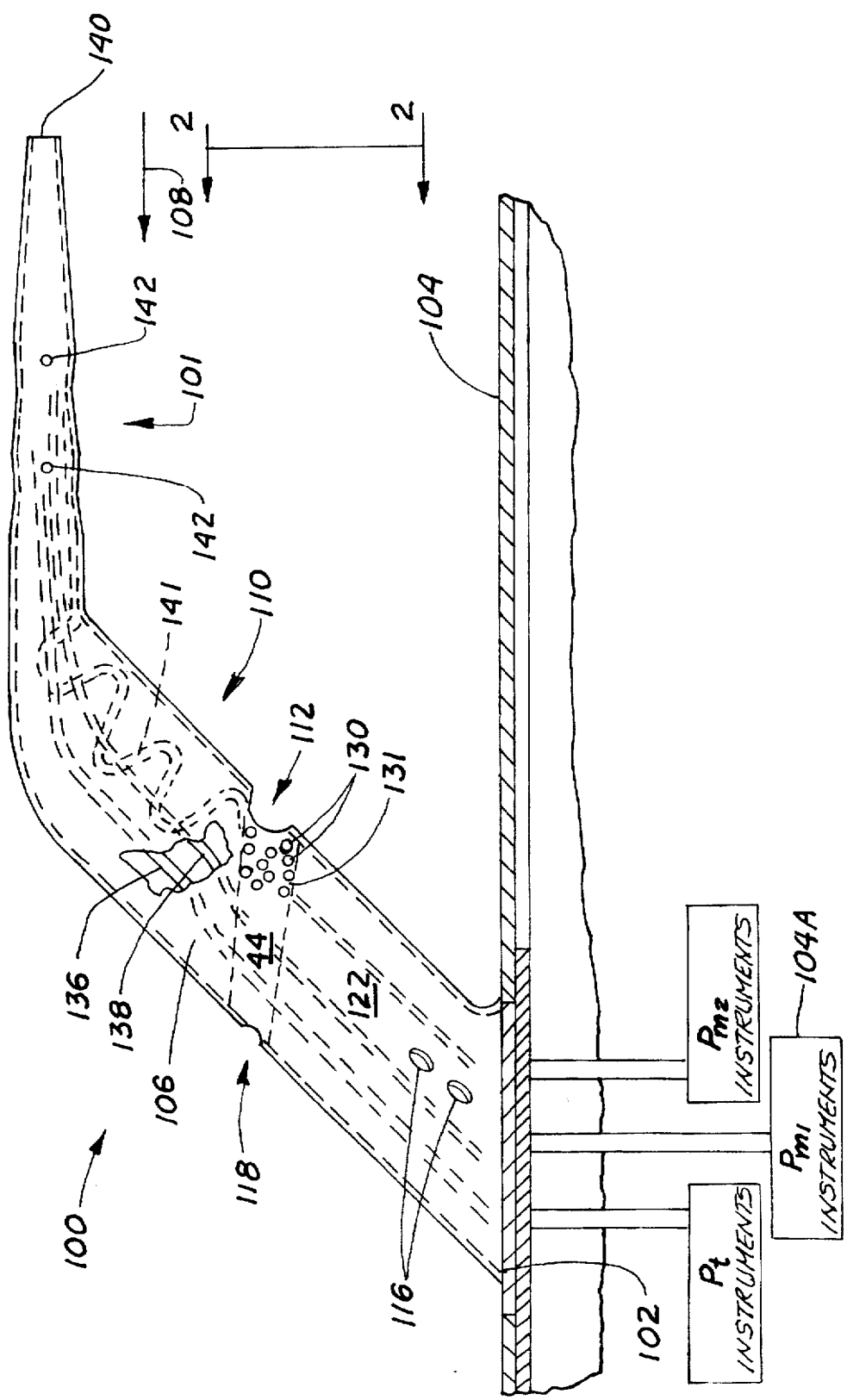
FIG. 1 is an view in side elevation of a first embodiment of the air data probe of the present invention.

In FIG. 1, an air data sensing probe, shown generally at 100, extends from a base member 102 connected to a mounting surface 104. A hollow aerodynamically-shaped strut 106 fixed to the base member 102 at a proximal end supports the probe 100 in position extended into a-fluid stream, denoted by arrow 108, so that a leading edge 110 faces generally toward the fluid flow 108. The side surfaces of the walls of strut member 106 have convex shapes in lateral cross section, which generates a well-known pressure gradient when subjected to the fluid flow represented by arrows 108 as discussed in detail below. A sensor inlet port 112 adjacent the leading edge 110 of the aerodynamic strut 106 admits the fluid 108 into a primary fluid cavity 114. The positive fluid pressure near the leading edge 110 of the probe 100 provides a first pressure differential at the leading edge 110 relative to the interior of the strut 106. The interior of the strut 106 fluidly couples through apertures in the side walls of the strut to an area of reduced pressure at the exterior of the lateral sides of the strut 106. A second pressure differential between the primary cavity 114 and the exterior of the strut 106 operates to draw the boundary layer fluid through the first group of apertures 130. The first pressure differential urges a portion of the fluid represented by arrows 108 into the primary fluid cavity 114 before discharge of the fluid from the probe 100 through a sensor fluid exhaust port or ports 116 fluidly coupling to an area of reduced pressure. The fluid inlet 112 can comprise more than one port and can be located on either lateral surface of strut 106 reasonably adjacent the leading edge 110. The location of the inlet port 112 can be determined with reference to known pressure distribution data.

Figure 2:
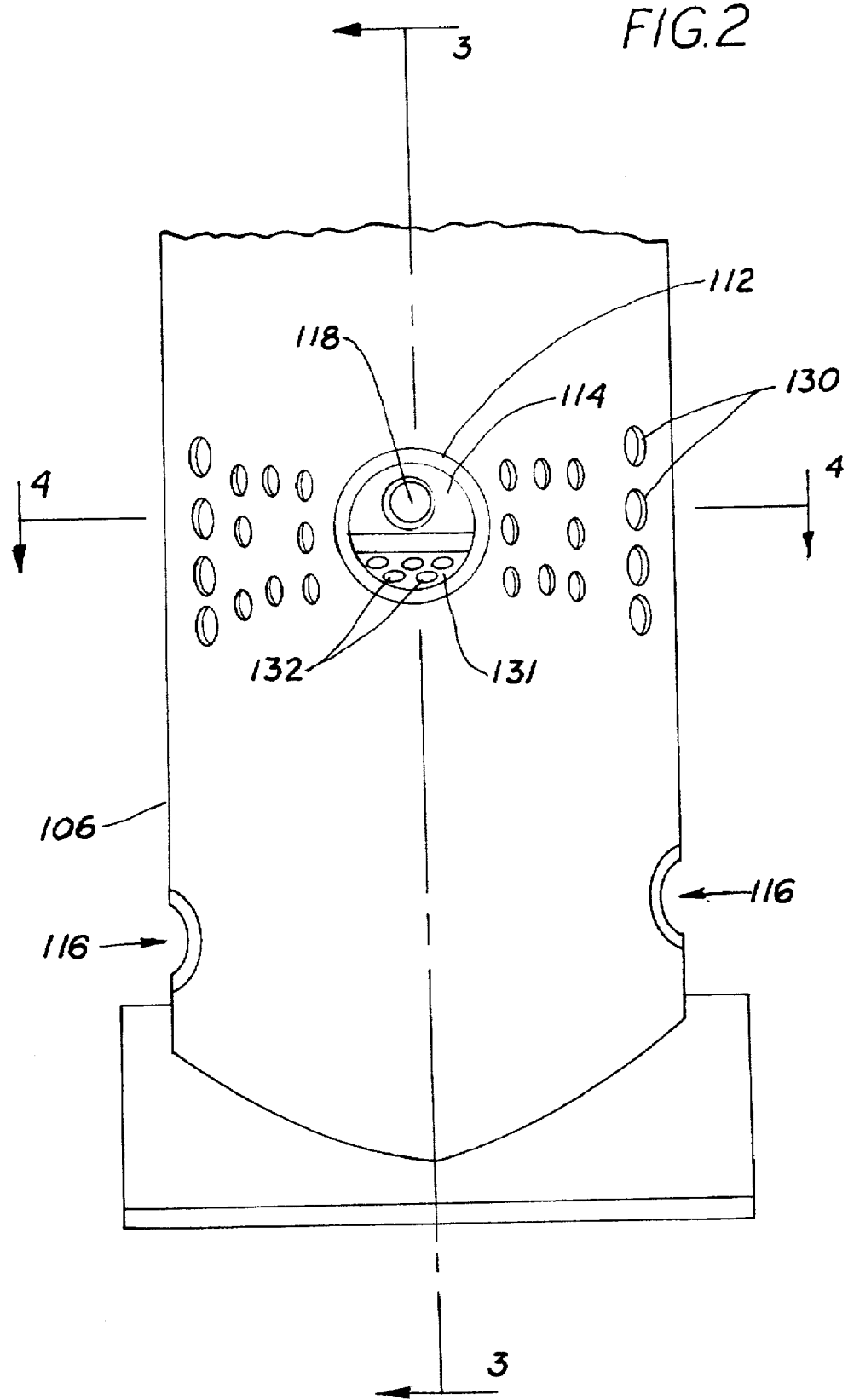
FIG. 2 is a view in front elevation of the air data probe of FIG. 1 taken along lines 2—2 of FIG. 1.
Figure 3:
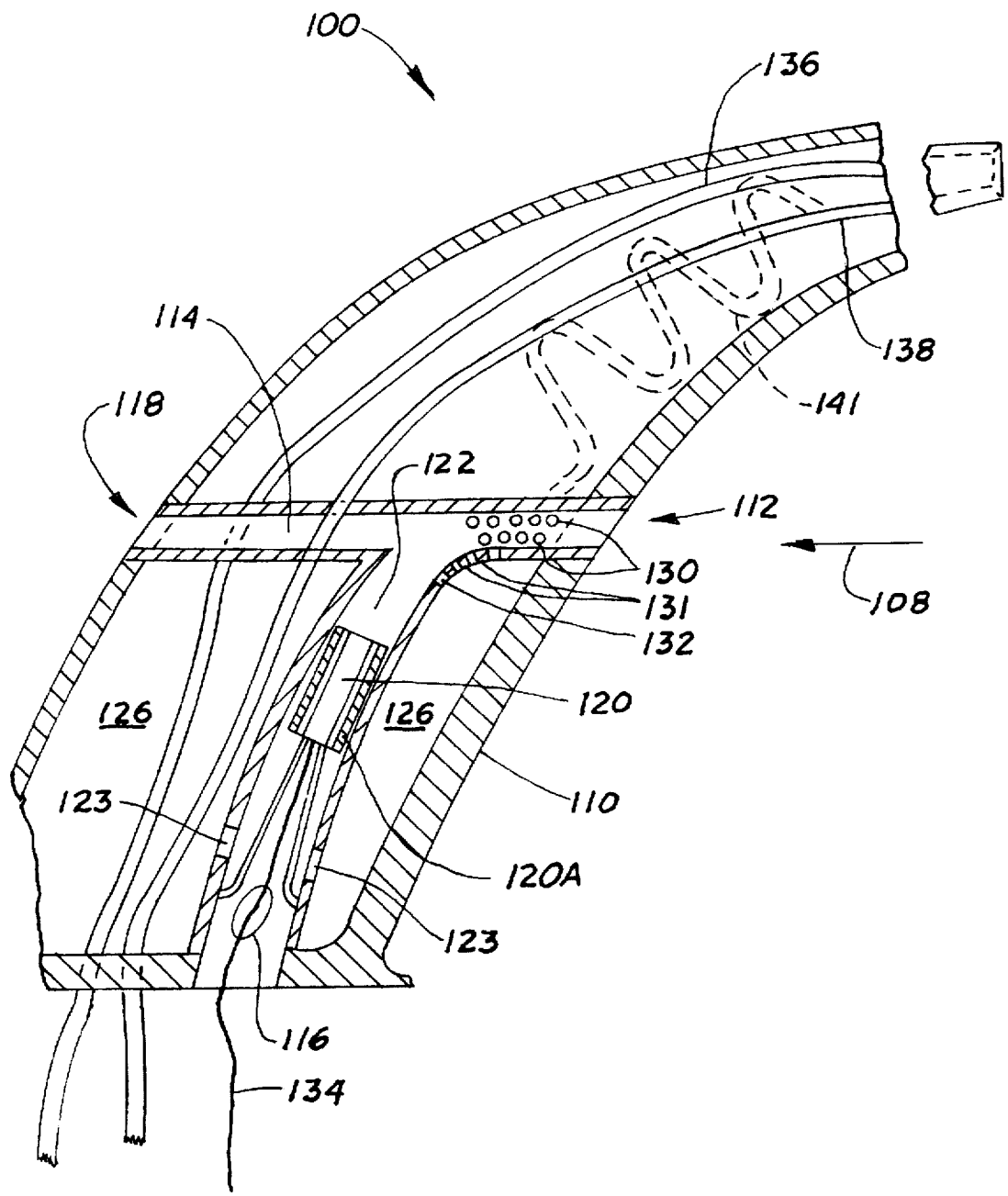
FIG. 3 is a view in side section of a modified embodiment of the combination air data probe of the present invention.

As shown in FIGS. 2 and 3, which is a modified shape of the air data sensor and strut,but with the same interior construction, a portion of the fluid represented by arrows 108 passes through fluid inlet 112 and enters the primary cavity 114, which couples to a secondary cavity 122 extending at an intersecting angle with respect to the primary cavity. The secondary cavity 122 houses a temperature sensing element 120 to measure the temperature of the fluid 108. The longitudinal axis of the secondary cavity 122 preferably forms an obtuse angle with the downstream (rearward) extension of the longitudinal axis of primary cavity 114 at their junction. The longitudinal axis of the primary cavity parallels the fluid flow direction. As is known, the pressure gradient outside of an aerodynamic body similar to the air data probe 100 begins with positive pressure at the leading edge 110 and an area of progressively reduced pressure is present with increasing distance aft of the leading edge. Maximum negative pressure is near the point of maximum lateral thickness of the aerodynamic body. Since measuring total temperature requires a portion, but not all, of the fluid flow to impinge upon the temperature sensing element 120, the inlet 112 is located in an area of positive pressure and the exhaust ports 116 located in a less positive or negative pressure zone so that suitable fluid flow through probe 100 occurs. Accordingly, the one or more fluid bleed holes 116 couple the interior of a tertiary cavity 126 to the exterior of strut 100 in an area of reduced fluid pressure on the exterior of the strut compared to the fluid pressure at the inlet 112 to promote fluid flow therethrough. Thus, the exhaust openings 116 preferably are located near the thickest lateral dimension of the probe 100, to urge a sample core of fluid flowing through the interior cavities of the probe 100 to pass out the exhaust openings 116 due to the fluid pressure differential present between the interior cavity and the exterior of the probe.

In FIG. 2, the first group of apertures 130 are shown and fluidly couple the surfaces defining the primary cavity 114 to the lower pressure region of the exterior of strut 106 to remove an amount of a boundary layer fluid from the surfaces defining the inlet region of the primary cavity 114 on the interior of the strut. The first group of apertures 130 operate to withdraw boundary layer fluid from the relatively high fluid pressure present at the inlet to primary cavity 114 and expel the boundary layer fluid to an area of relatively lower fluid pressure at the lateral exterior surface of the probe 100. A second group of apertures 132 formed through a deflector wall member 131 bleed boundary layer fluid from the primary cavity 114 and also from the inlet region of the of the second cavity 122 adjacent the junction with the primary cavity, into a tertiary cavity 126, which is maintained at a relatively reduced pressure by bleed holes 116. Thus, the core sample of the fluid indicated by arrows 108 impinges upon the suitable temperature sensing element 120 disposed in the second cavity 122. Temperature sensing element 120 provides an output signal on line 134 for use by suitable air data processing equipment, not shown. Temperature sensing element 120 may comprise an electrical resistance thermometer, thermistor, optical pyrometer sensor, or other sensor as known or later adapted in the art.

Inertial separation of entrained particles occurs when the fluid entering the primary cavity flows over the opening to the secondary cavity,which is a zone of decreased pressure, which extends over a part of the deflector member 131. The particles, which possess inertia, do not turn as they flow over the corner where the secondary cavity 122 and the primary cavity 114 intersect. Therefore, the entrained particles continue on a generally linear course through the primary cavity 114 and vent from the primary fluid exhaust port 118 formed in a low pressure area downstream of the entrance to the secondary cavity 122. The exhaust port can be at the terminal end of the primary fluid cavity 114 of the probe 100 or can be formed through the sidewall of the strut. Thus, water droplets, ice particles and other debris entrained in the fluid pass through only the primary cavity 114 and do not enter the secondary cavity 122 nor impinge on the sensing element 120. Substantially all of the entrained particles are eliminated by inertially passing over the opening from cavity 114 to cavity 122 along the deflector member 131 because of the angled orientation between primary cavity 114 and secondary cavity 122.

Boundary layer fluid separation occurs as a result of the distributed boundary layer fluid withdrawal so that only core sample fluid impinges upon temperature sensing element 120. Thus, in operation only a substantially particulate-free core of unheated fluid flows around the contour of the corner formed by primary cavity 114 and secondary cavity 122. The temperature sensing element 120 generates an output signal on line 134 related to the total temperature of the flowing fluid. Sensor fluid exhaust ports 116 formed through the exterior wall of the probe from cavity 126, which can be near the base end of the strut and spaced from temperature sensing element 120, allows the unheated fluid drawn over the sensing element 120 to flow from inside the probe 100 at a point of reduced pressure, as described above.

In FIG. 1 the probe 100 connects to a relatively conventional barrel-shaped pitot or pitot-static probe head 101 mounted facing the fluid flow represented by arrows 108 at the end of the strut 106 remote from the mounting surface 104. The pitot, pitot-static or angle of attack probe is joined to the strut 106, with few modifications being required for the implementation of the pressure sensing features which are well known in the art. Suitable tubes or ducting 136,138 are provided to at least one static pressure port 142 and/or one pitot pressure port 140, and suitable heating means 141 is provided to remove or avoid ice buildup.

The tubes or ducting 136,138 lead to instrumentation shown at 140A for pitot pressure instruments and labeled Pm1 and Pm2 for the static pressure indications as shown in U.S. Pat. No. 4,730,487.

The suitable heating elements 141 added to the outer shell of probe 100 allows all-weather operation of the probe 100. The heating elements 141 can be internally brazed into the strut 100 or externally brazed into grooves on the outside of strut 100 to provide a deicing capability necessary for accurate operation of probe 100 under severe icing conditions. A further deicing capability results from circulation of ingested fluid through various apertures 123 fluidly coupling the secondary cavity 122 to the tertiary cavity 126 so that fluid flows into the tertiary cavity 126 and circulates within the heated interior spaces forming cavity 126 of the probe before being expelled through the exhaust ports 116. This internal fluid circulation reduces the thermal output required from the heater 141 so that heat generated from the heater 141 is reduced, to in turn reduce the heater effect on the temperature sensing element 120. Heating element 141 imparts a higher temperature to the tertiary cavity 126 so that the fluid circulating within tertiary cavity 126 conducts heat to the probe walls to efficiently deice the probe 100. Appropriate protective shielding 120A (FIG. 3) for the sensing element 120 can be used to shield the sensing element 120 from thermal and radiation transients, as known in the art.

Figure 4:
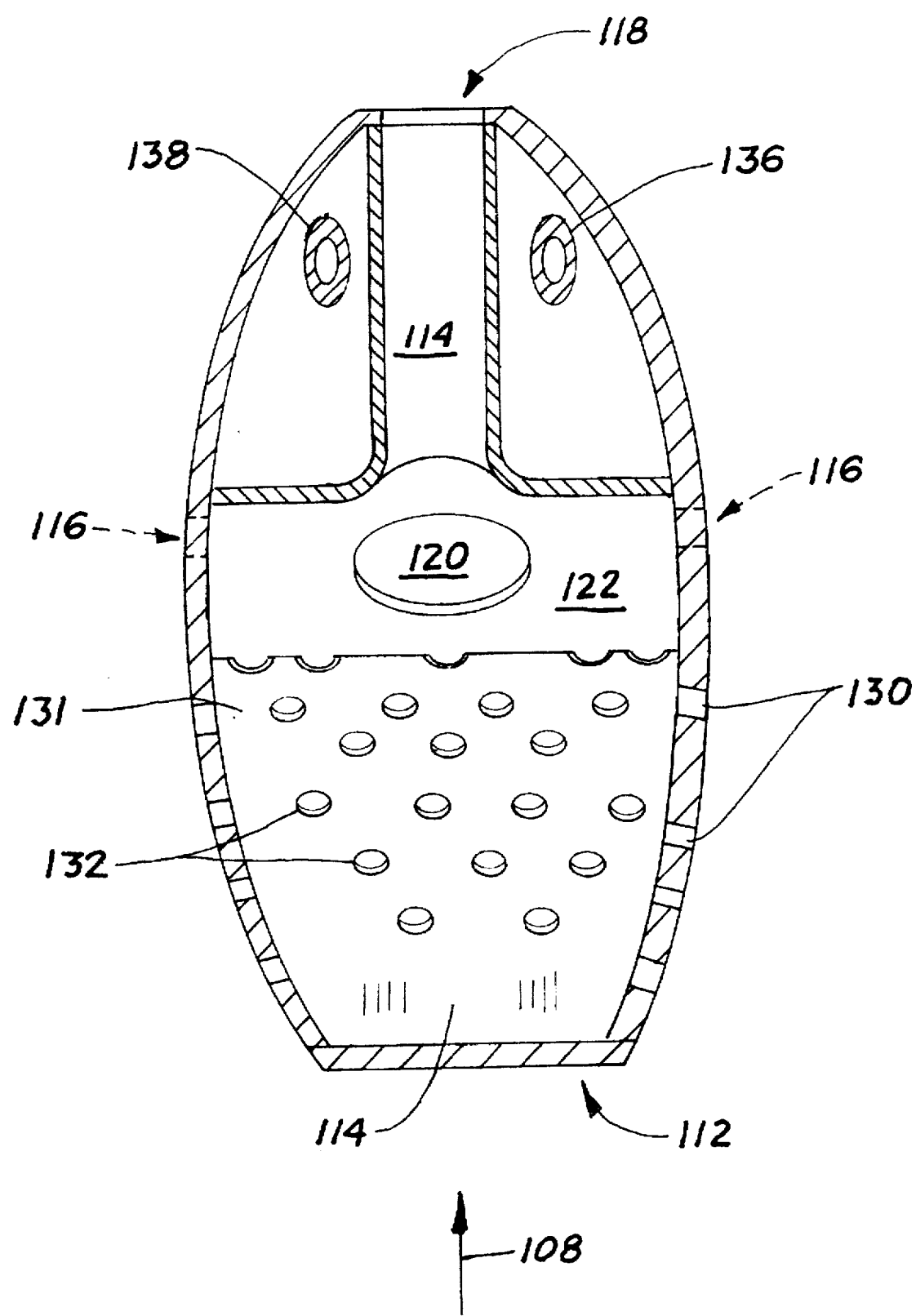
FIG. 4 is a view in cross section of the present air data probe taken along lines 4—4 of FIG. 2.

FIG. 3 is a modified shape air data sensor mounted on a strut section having an interior cavity arrangement identical to FIGS. 1, 2 and 4. The outer end of the strut section shown in FIG. 3 curves from the strut section forwardly toward a leading end that faces upstream and which can have pitot and static ports, as shown on the barrel shaped probe of FIG. 1.

FIG. 4 illustrates the preferred configuration of the inlet aperture 112, the first group of boundary layer bleed apertures 130, the second group of apertures 132, the deflector member 131 and exhaust ports 116 of the present invention cooperate so only the desired sample core of fluid reaches the temperature sensing element 120. The relatively high pressure fluid present in a first portion of primary cavity 114 forces the fluid present in secondary cavity 122 to bleed through exhaust ports 116 to an area of reduced pressure so that free stream fluid (as opposed to boundary layer fluid) is sensed by the temperature sensing element 120, which generates an output signal on line 134. Removal of the boundary layer fluid by distributed withdrawal of fluid from surfaces upstream of the inlet can also be accomplished by use of slits,or a porous or a properly sintered surface in place of the first apertures 130 and second apertures 132.

Although the present invention has been described with referenced to preferred embodiments, workers skilled in the art will recognize that changes may be made in form and detail without departing from the spirit and scope of the invention.

What is claimed is:

1. Art air data probe for sensing parameters of a fluid moving relative to the probe,. comprising:
   an aerodynamic strut having a leading edge and trailing edge with at least one inlet aperture formed proximate the leading edge of the strut and a primary cavity fluidly coupled to the at least one inlet aperture at a first end and fluidly coupling to at least one exhaust port and further having a secondary fluid cavity fluidly coupled to a first portion of the primary fluid cavity, and extending away from the primary cavity, the secondary fluid cavity being coupled to one or more fluid discharge ports opening to an area of reduced fluid pressure;
   temperature sensing means disposed in the secondary fluid cavity for detecting a temperature parameter of the fluid moving therethrough and providing an output signal thereof; and
   a porous wall portion forming an interior surface of at least an inlet portion of the secondary fluid cavity adjacent the primary fluid cavity to promote withdrawal of boundary layer fluid from the inlet portion.

2. The air data probe of claim 1, and a second porous wall portion forming part of the strut coupling the exterior of the strut to interior surfaces defining an inlet portion of the primary fluid cavity to promote withdrawal of boundary layer fluid from the interior surfaces of the inlet portion of the primary fluid cavity.

3. The air data probe of claim 1, wherein the strut has a base member which includes mean for mounting the base member to an air vehicle.

4. The air data probe of claim 1, wherein the strut curves in direction to form an end facing fluid flow outwardly from the base member.

5. The air data probe of claim 1, wherein a radiation shield surrounds the temperature sensing means.

6. The air data probe of claim 1, and a heating means for deicing and anti-icing the probe is attached in thermal communication with the strut member.

7. The air data probe of claim 1, wherein the temperature sensing means comprises a platinum resistance element.

8. The air data probe of claim 1, further comprising an elongated barrel member having at least one aperture, and attached to a portion of the leading edge of the strut member; and manifold means for conveying pressure signals connected to the at least one aperture.

9. The air data probe of claim 8, wherein the manifold means comprises a plurality of pressure-sensitive conduits.

10. The air data probe of claim 9, wherein the strut comprises a pitot-static probe.

11. An air data probe for sensing parameters of a fluid moving relative to the probe, comprising:
    a barrel member having an end portion facing in a direction toward the fluid flow;
    an aerodynamic strut having a base portion and supporting the barrel at a distal end of the strut spaced laterally from the base portion, the barrel member having fluid pressure ports thereon spaced from the base portion;
    the strut having a leading edge and a trailing edge with at least one inlet aperture formed proximate the leading edge of the strut and a primary cavity fluidly coupled to the at least one inlet aperture at a first end and fluidly coupling to at least one exhaust port in the strut, and the strut further having a secondary fluid cavity fluidly coupled to a first portion of the primary fluid cavity, and extending away from the primary cavity, and coupled to one or more fluid discharge ports in the strut opening to an area of reduced fluid pressure;
    temperature sensing means disposed in the secondary fluid cavity for detecting a temperature parameter of the fluid moving therethrough and providing an output signal thereof; and
    a porous wall portion forming part of the strut and extending from adjacent the exterior of the strut to a first portion of the primary fluid cavity and forming a wall between the primary fluid cavity and at least a portion of the secondary fluid cavity, the porous wall portion passing boundary layer fluid from the interior of the probe through the porous wall portion.

12. The air data probe of claim 11 wherein the strut curves in direction toward fluid flow as it extends in direction away from the base portion to form the probe barrel end portion.

13. The air data probe of claim 11 wherein the secondary cavity intersects the primary cavity and extends laterally therefrom at an angle relative to the direction of fluid flow through the primary cavity such that particles flow across the intersection of the primary and secondary cavities.

14. The air data probe of claim 11 wherein the strut has a width between its leading and trailing edges, the width being great enough to cause a reduction in pressure in regions along sides of the strut.

* * * * *

UNITED STATES PATENT AND TRADEMARK OFFICE
CERTIFICATE OF CORRECTION

PATENT NO. : 5,731,507
DATED : March 24, 1998
INVENTOR(S) : Floyd W. Hagen et al.

It is certified that error appears in the above-identified patent and that said Letters Patent is hereby corrected as shown below:

```
Column 5, line 49, cancel "Art" and
    insert --An--;

Column 5, line 50, after "probe," cancel ".".
```

Signed and Sealed this

Second Day of November, 1999

Attest:

Q. TODD DICKINSON

Attesting Officer

Acting Commissioner of Patents and Trademarks